Dec. 8, 1970     R. C. MAGEE ET AL     3,545,826

COMPLIANT AND SELF-ALINING BALL BEARING FOR LINEAR MOTION

Filed May 7, 1969     3 Sheets-Sheet 1

INVENTORS
ROBERT C. MAGEE
JOHN B. THOMSON
BY
Morgan, Finnegan, Durham & Pine
ATTORNEYS

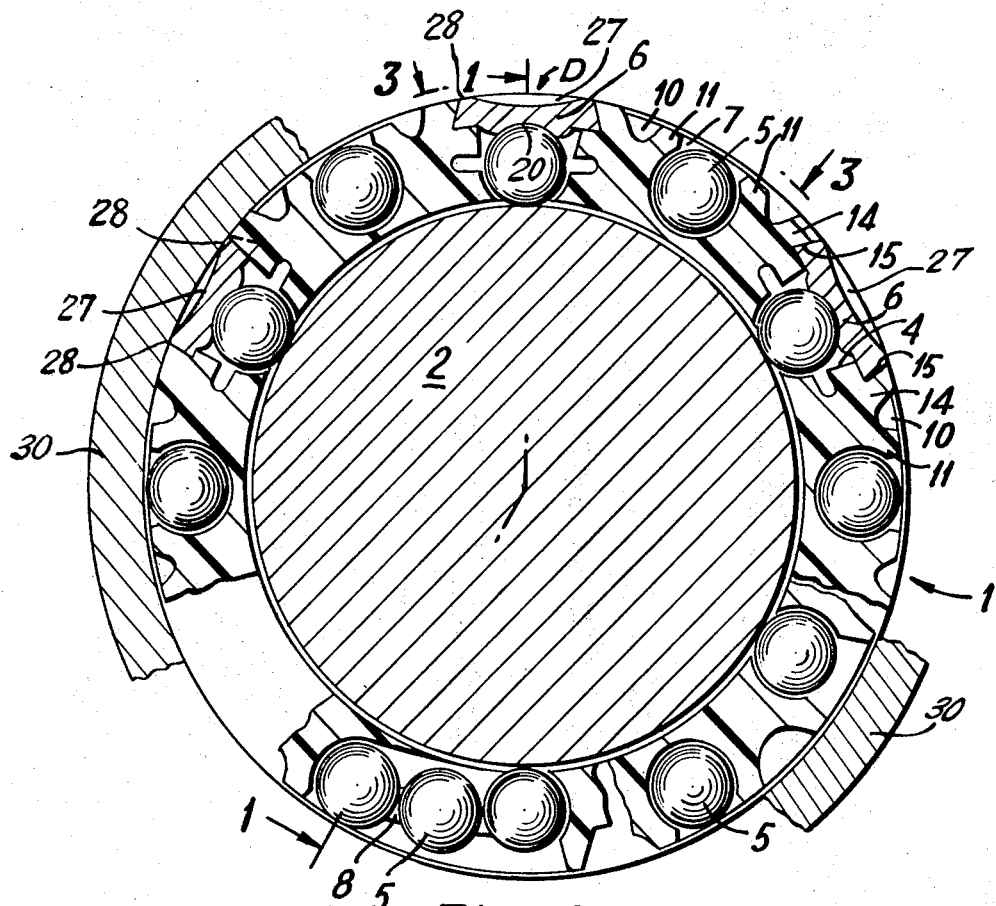
FIG. 2
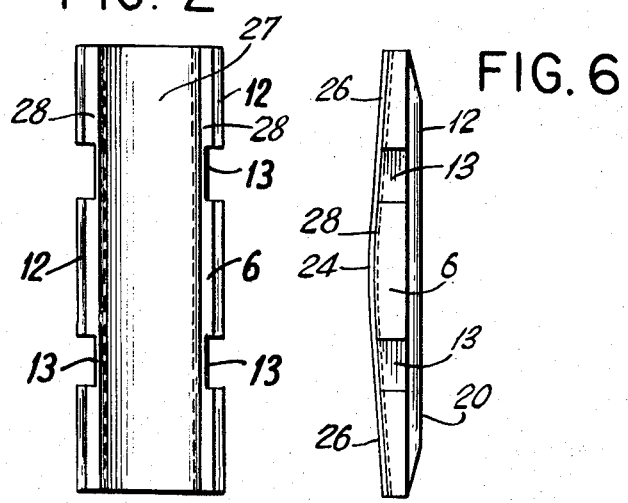
FIG. 5
FIG. 4
FIG. 6
INVENTORS
ROBERT C. MAGEE
JOHN B. THOMSON
BY
Morgan, Finnegan, Durham & Pine
ATTORNEYS Dec. 8, 1970  R. C. MAGEE ET AL  3,545,826
COMPLIANT AND SELF-ALINING BALL BEARING FOR LINEAR MOTION
Filed May 7, 1969  3 Sheets-Sheet 3

INVENTORS
ROBERT C. MAGEE
JOHN B. THOMSON
BY
Morgan, Finnegan, Durham & Pine
ATTORNEYS United States Patent Office 3,545,826
Patented Dec. 8, 1970

3,545,826
COMPLIANT AND SELF-ALINING BALL BEARING FOR LINEAR MOTION
Robert C. Magee, Manhasset, N.Y., and John B. Thomson, 1029 Plandome Road, Manhasset, N.Y. 11030; said Magee assignor to said Thomson
Filed May 7, 1969, Ser. No. 822,504
Int. Cl. F16c 29/06
U.S. Cl. 308—6                              12 Claims

ABSTRACT OF THE DISCLOSURE

A complaint and self-aligning, linear motion ball bearing is provided which is a modification of, and improvement over the non-self-aligning, linear motion ball bearing disclosed in the prior U.S.A. application of Heinrich Weisel, Ser. No. 699,070 filed Jan. 19, 1968, and in German Pat. No. 1,268,442.

The load carrying plates of the Weisel bearing embedded in a resilient plastic sleeve are modified and are each exteriorly tapered from their central portion towards their longitudinal ends whereby the plates may rock as there is relative displacement between the shaft and the bore in which the bearing is mounted. The present bearings thus provide for angular displacement of the shaft in all directions. In addition, the load bearing plates are compliant along both the lateral and longitudinal axis. The two axes compliance provides springiness, better ball conformity and uniform distribution of load which combine to substantially increase load capacity and life in addition to that obtained from self-alignment.

BACKGROUND AND OBJECTS OF THE INVENTION

The present invention relates generally to self-alining ball bearings for linear motion, and relates more particularly to certain new and useful improvements in the retainer member for such ball bearings.

Ball bearings for linear motion in which the ball traverse continuous closed circuits have previously been proposed to meet the need for anti-friction linear bearings but have not provided for any misalinement of the shaft with respect to the bore in which the bearing is mounted.

It is therefore an object of the present invention to provide a self-alining linear motion ball bearing.

In its preferred form, the load carrying plates are each formed with a longitudinally extending depression on its outer face between circumferentially extending longitudinal portions whereby the intermediate portion of the plate may yield resiliently under load. The plates are also tapered which provides longitudinal compliance by bending as well as by self-alinement.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is embodied in a novel self-alining linear motion ball bearing, the oblong raceways each having load-bearing and load-free portions, in which the ball retainer is preferably formed from a moldable material. A hard and preferably resilient load-carrying plate is attached to the portion of each of the raceways in which the balls directly contact the shaft upon which the bearing is mounted. The load-free portions of the raceways surround the balls by more than 180° so as to retain and guide the balls in the raceway. Advantageously, the retainer is formed with a groove about and closely adjacent to each boundary edge of the raceways so as to facilitate "snap-in" insertion and withdrawal of the balls and load-carrying plate into and out of the retainer. The load-carrying plate is also advantageously attached to the retainer in a manner so as to prevent its axial movement therein. To this end, the notches therein which engage with corresponding underplate is provided with beveled longitudinal edges having cuts and tab projections in the retainer member. The retainer may be one piece construction, or two piece to facilitate molding and assembly.

The improvement of the present invention is achieved by providing for each of the load-carrying plates to rock into and out of parallelism with the axis of the ball retainer and for this purpose each of the load-carrying plates is tapered on its outer surface away from a central thicker portion. The rocking action of the plates causes a reduction in the bore diameter therefore the shape of the outer rocking surface is important. For example, for a one inch bearing bore diameter, a one-half a degree of misalignment will cause a bore reduction of .00068 inch for a modified curve and .000062 inch for a V profile. A short curved portion, or rounding of the point of the V is desirable to prevent housing wear due to a sharp line contact.

Each of the load-carrying members is preferably slightly resilient both circumferentially and axially of the bearing, and the groove in which the balls run has a slightly larger radius than the radius of the balls.

When the shaft is angularly displaced with respect to the retainer axis, the load-carrying members rock about their thick portions compressing or bending the resilient material of the retainer so that the load-carrying members substantially parallel to the bearing shaft.

It will be understood that the foregoing general description and the following detailed description as well are exemplary and explanatory of the invention but are not restrictive thereof.

The accompanying drawings, referred to herein and constituting a part hereof, illustrate two embodiments of the invention, and together with the description, serve to explain the principles of the invention.

BRIEF DESCRIPTION OF THE DRAWINGS

FIG. 2 is a fragmentary, transverse sectional view taken along lines 2—2 and 2a—2a of FIG. 1, partly in elevation, illustrating a series of ball raceways which extend longitudinally of the bearing at evenly spaced intervals about the shaft;

FIG. 4 is a view in top plan of the load-carrying plate which is mounted in the load-bearing portion of each raceway, the location of which is best seen in FIG. 3;

FIG. 5 is an end view of one of the load-carrying members used in the bearing;

FIG. 6 is a side elevation of the member shown in FIG. 5;

DESCRIPTION OF THE PREFERRED EMBODIMENT

Figure 1:
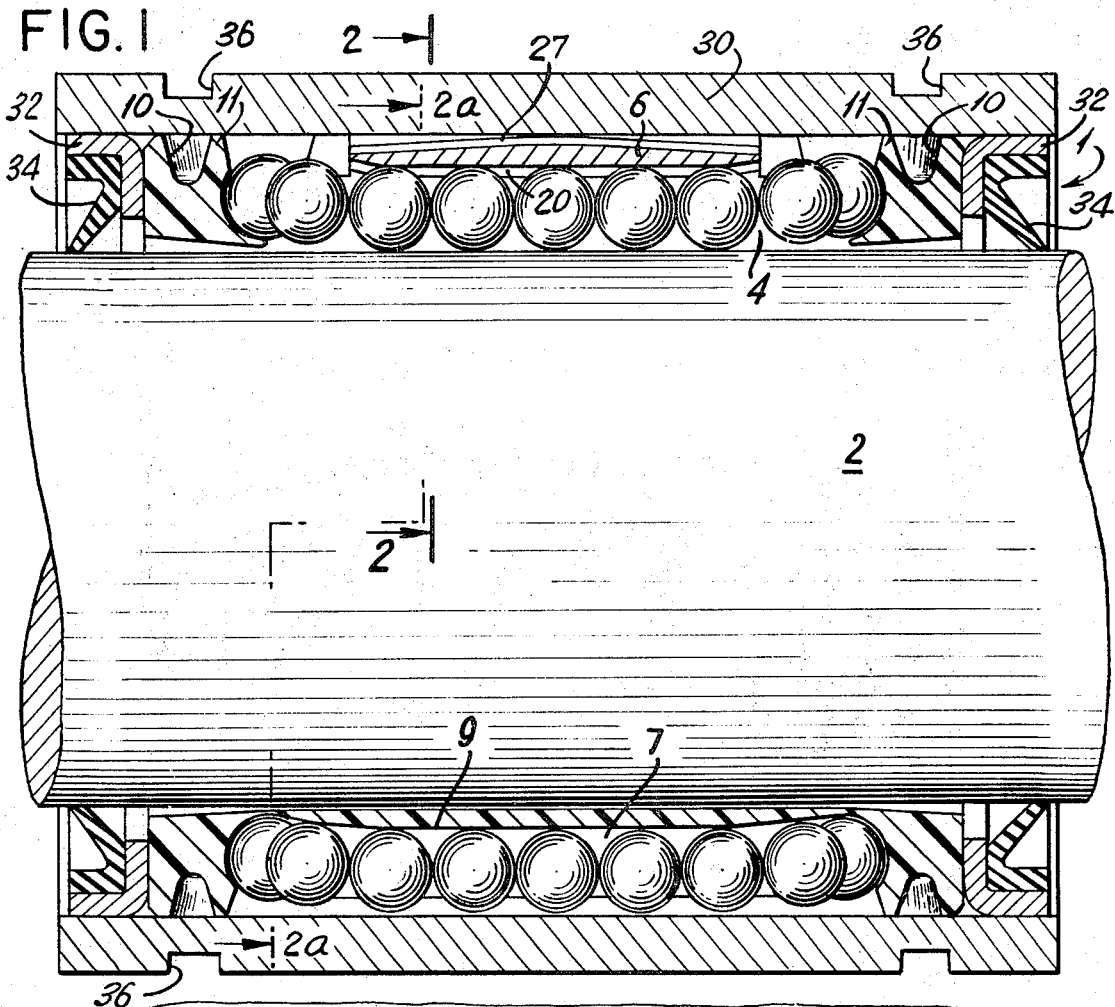
FIG. 1 is a view, partly in elevation and partly in longitudinal section, of a ball bearing assembly constructed in accordance with the invention, shown in operative relation about a shaft upon which it is mounted, the upper section illustrating the load-bearing portion of an individual raceway while the lower section illustrates that portion of an individual raceway in which the balls are load-free.

Referring now to the embodiment of the invention shown in the accompanying drawings, there is illustrated a ball retainer 1, surrounding a shaft 2, and having a plurality of generally oval-shaped raceways 3 formed therein, each being designated only generally by the foregoing reference numerals.

Figure 3:
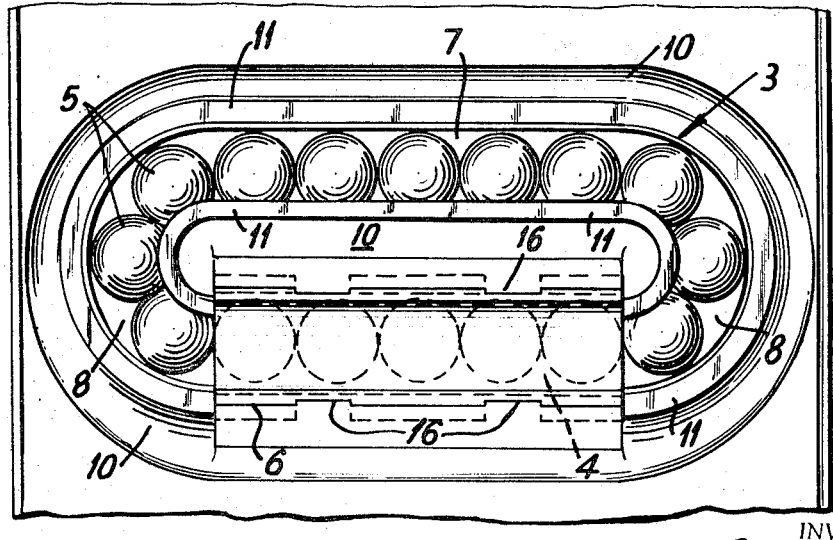
FIG. 3 is an enlarged, fragmentary view in top plan, taken in the direction of arrow D between line 3—3 of FIG. 2, illustrating an individual ball raceway of the bearing assembly of the invention.

As best seen in FIG. 3, each oblong raceway 3 has a first straight, load-bearing portion 4 wherein the recirculating balls 5 are in direct bearing contact with both the shaft 2 and a load-carrying plate 6 and a further straight portion 7, wherein the balls 5 are out of contact with the shaft and are free of the load. The straight portions 4 and 7 are connected by a pair of curved portions 8, which permit the recirculating balls to pass freely from one straight portion of the raceway into the other according to the direction in which the load-carrying balls are impelled by the relative movement of the bearing shaft.

In accordance with the invention, the ball retainer 1 is preferably formed as a single, integral unit from a resilient, non-metallic material. An example of a material which has been found to operate entirely satisfactorily is nylon, and it will be apparent that other moldable materials will operate satisfactorily. Advantageously, the material is selected so that the retainer may be produced by low cost, high speed, mass manufacturing methods, such as injection molding.

Advantageously, and as here preferably embodied, the bottom of the straight, load-bearing portion 4 of each raceway 3 is slotted so that the balls 5 may contact the shaft 2, the slot being somewhat narrower than the diameter of the balls. The slot terminates at each end of the straight portion 4 whereupon the bottom is closed and is slightly inclined along the curved portion 8 of the raceway until it reaches the level of the bottom 9 of the straight, load-free portion 7 of the raceway. It will thus be seen that the balls 5 are in direct contact with both the shaft 2 and the load-carrying plate 6 when in the straight portion 4 of the raceway but have no contact with either the shaft 2 or the load while in the curved portions 8 or straight portion 7 of the raceway.

In accordance with the invention, the load-free portion 7 and the connecting portions 8, of each raceway 3, are shaped so as to encircle more than 180° of the circumference of the balls 5, whereby the top of these portions 7, 8 of the raceways is narrower than the ball diameter to thereby retain and guide the balls within the raceways and yet permit rapid "snap-in" insertion and withdrawal of the balls into and out of the retainer. The balls 5 are retained in the load-bearing portion 4 of each of the raceways by means of the load-carrying plate 6.

Advantageously, and as shown in FIGS. 1 to 5, retainer 1 is formed so as to have grooves 10 closely adjacent to each edge of the raceways 3, to thereby form the boundary edges 11 of the raceway (FIG. 2), so as to facilitate self-alining, rocking and the insertion and withdrawal of the balls 5 into and out of the raceway, as well as the bearing plate.

In accordance with the invention, means are provided for attaching a load-carrying plate to the load-bearing portion of each of the raceways 3 so as to prevent axial movement of the plate relative to the retainer, as well as to permit a slight radial movement of the plate, the latter facilitating a proper seating of the load plate in the housing bore (not shown). To this end, as best seen in FIG. 4, each plate 6 is provided with longitudinally extending tapered edges 12 and is also provided on its longitudinal edges with a pair of opposed notches 13. Similarly, the boundary edges 14 of the retainer 1 adjacent the portion 4 of the raceways are undercut at 15 so as to conform to the tapered edges 12 of the plate 6 and further include projecting tabs 16 for engaging the notches 13, thereby securely locating the plate in position and preventing relative axial movement between the plate and the retainer 1. It will also be seen that grooves 10 permit rapid "snap-in" insertion and withdrawal of the load-carrying plates, in the same manner as described in connection with the insection and withdrawal of the balls 5 in the raceways.

The foregoing detailed description has described a linear motion ball bearing which is similar to that disclosed in the prior application of Weisel referred to above. The improvements of the present invention are differentiated therefrom as will be described below.

Load carrying plates 6 are shown in detail in FIGS. 4, 5 and 6. On its inner surface each plate has an axially extending cylindrical groove 20 in which the load-carrying balls may roll. Preferably, each of the grooves 20 has a radius very slightly larger than the radius of the balls 5 rolling therein, so that the plate may yield as it is placed under load. Each of the plates is relieved at its ends 22 to facilitate transfer of the balls from the working track to the non-working portions of the raceway.

On its outer portion each of the members 6 is formed with an intermediate or longitudinally central portion 24 which is thicker than the end portions 26. The intermediate portion 24 is preferably tapered longitudinally on its exterior surface at a small angle towards both ends. Thus the intermediate curved portion 24 forms a rocking fulcrum allowing the members 6 to rock by slight displacement of the resilient mass of the retainer in which they are embedded and held as the shaft 2 is angularly displaced with respect to the axis of the bearing.

In order to increase the load-carrying capacity of the bearing, each of the plates 6 is formed with an external, longitudinal depression 27 bordered by two longitudinally extending lands 28 by which each of the plates 6 is supported in the mounting bore, thereby providing an intermediate area of reduced thickness which provides compliance to the working portion of the groove in the plate 6 and serves to distribute the load over a wider area than would be the case with a rigid plate 6 or a plate having its central portion resting against the bores. The longitudinally tapered ends of the plates 6 also provide a degree of resilience in the axial direction of the bearing and likewise distribute the load by compliance since the loading is seldom uniform about the length of a linear ball bearing. This bi-axial resiliency results in increased load capacity and greater life than is obtainable with a rigid race member.

Where the bearing is to be mounted in a bore which is of soft metal subject to wear, or only roughly finished, the bearing may be enclosed within a cylindrical sleeve 30 of hard metal, such as steel and held therein by press-fitted or swaged end rings 32. It may also be provided with bearing seals 34 of rubber or similar resilient material. On its exterior, sleeve 30 is conveniently provided with annular grooves 36 to receive C-rings, not shown, by which the bearing is held against axial displacement in its mounting.

In use, the bearing operates in much the same general manner as the Weisel bearing except that it provides for self-alinement of the load-carrying balls with an angularly displaced shaft by the rocking action of the members 6 which can rock about their control or intermediate portions due to the resiliency of the retainer while allowing the inner track portion of each member 6 to remain parallel to the associated shaft 2. Also, the bi-axial compliance of the load-carrying plates serves to distribute the load of the working balls over a larger area of the raceway grooves 20.

DESCRIPTION OF THE MODIFIED EMBODIMENT

FIGS. 7 to 11 illustrate a modified embodiment of the invention.

As shown, the bearing comprises an outer shell 40 and a closely fitted ball retainer 42, both formed of a resilient non-metallic material, such as nylon.

The outer shell 40 is formed with apertures 44 to receive the several load carrying plates 46, which are symmetrically arranged circumferentially of the shell. Each of the plates 46 is formed of hard metal, and as with the plates 6 (FIGS. 4, 5 and 6) is provided with an internal axially extending parti-cylindrical groove 48 in which the balls 50 may roll, and an external groove 52 extending axially of the bearing and between the longitudinally extending lands 54 to provide compliance to the working portion of the groove 48. The central portion of each plate 46 is thicker than its longitudinal ends and it tapers in both directions from a rounded external fulcrum 56 at the center of the plate 46. On its internal side plate 46 is relieved at its ends 58 to facilitate transfer of the balls from the working track to the non-working portions of the raceway.

Figure 7:
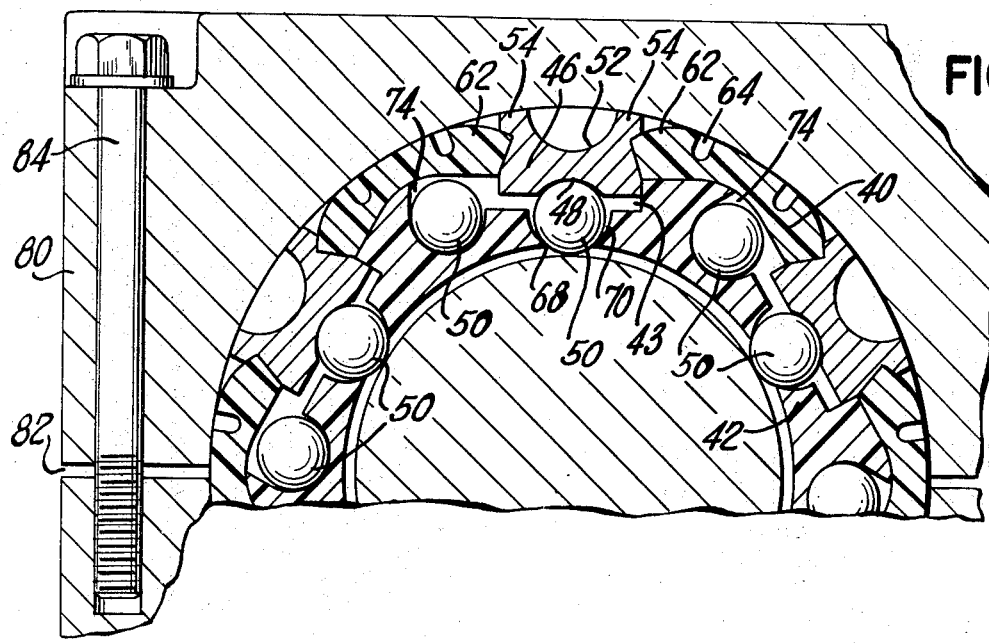
FIG. 7 is a fragmentary central cross section of a modified form of the present invention, and also showing an optional special application of the bearing of the present invention.
Figure 8:
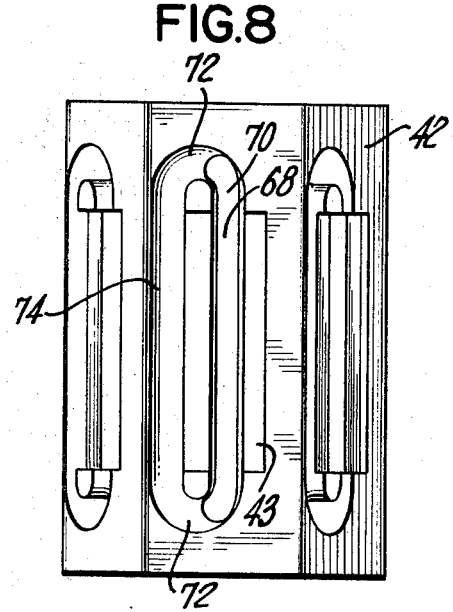
FIG. 8 is a top plan view of the ball retainer shown in FIG. 7.
Figure 9:
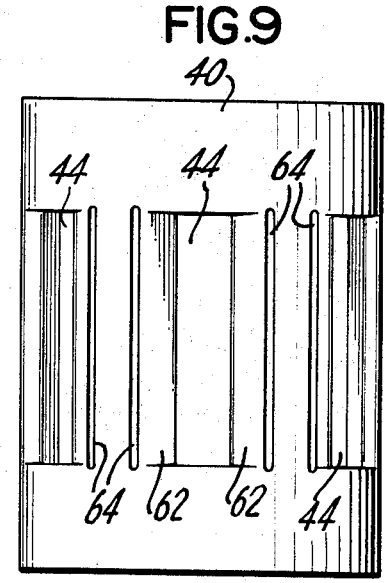
FIG. 9 is a top plan view of the outer sleeve shown in FIG. 7.
Figure 10:
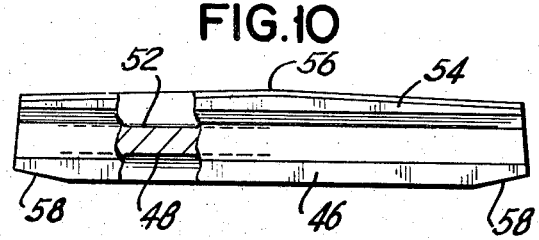
FIG. 10 is a detailed side elevation of one of the metal inserts forming a load-carrying portion of the outer raceway, also shown in FIG. 7.
Figure 11:
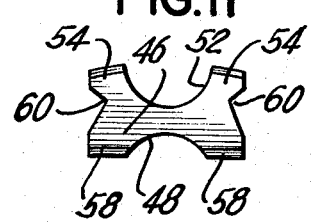
FIG. 11 is an end elevation of the insert shown in FIG. 10.

Means are provided for holding the plates 46 in their respective apertures 44, against both axial and circumferential movement and against radial dislodgement before being mounted for use. For this purpose both longitudinal side edges of each plate 46 is formed with a groove 60 which is engaged by a resilient projection 62 integral with the outer shell 40 and which allows the plate 46 to be pushed radially inward into its aperture 44 as shown in FIG. 7. In order to increase the resilience of the projection 62 longitudinally extending grooves 64 may be provided in the outer portion of the shell 40 adjacent at least one of each pair of projections 62.

The ball retainer 42 is provided with a plurality of symmetrically arranged oblong raceways each of which is slotted, as at 68, so that the balls may contact the shaft, the slot being somewhat narrower than the diameter of the balls. Each of the slots 68 terminates at each end of the straight portion 70 and is slightly inclined along the curved end portions 72 so that the balls are moved away from the shaft as the balls pass into the straight load-free portion 74 of the raceway to be returned to the other end of the straight portion 70.

The balls in the straight portion 70 of each groove roll along the shaft and against the groove 48 in the load carrying plates 46, which can move about their fulcrums 56 for self alinement of the bearing. Sleeve 42 is recessed at 43 to provide for unobstructed movement of the plates 46. At the same time, the load carrying plates 46 can yield to provide compliance to the working portion of the groove 48. Due to the resilient quality of the projections 62 there is no substantial resistance to the angular movement required of the plates 46 when the bearing is operating under self-alining conditions.

The outer shell 40 and the ball retainer sleeve 42 are preferably held against axial movement relative to each other as by cementing the contiguous plastic surfaces. The outer shell and ball retainer sleeve 42 may be made self-lubricating by incorporating a small amount of a lubricant such as finely divided molybdenum disulfide in the resilient plastic material such as nylon or Delrin of which the shell 40 and sleeve 42 are formed.

The bearing of FIGS. 7 to 11 will operate in the same manner as that of FIGS. 1 to 6.

When the ball retainer portions of the bearing are formed of a resilient material, the bearing structure may be mounted in an adjustable housing so that the bearing may be preloaded or have some degree of clearance, as desired. Thus, the linear motion ball bearing of FIGS. 1 to 6 and 8 to 11, may be mounted in a split block 80, as shown in FIG. 7. The gap 82 in block 80 may be adjusted by means of the cap screw 84, to compress the bearing and reduce its clearance on its shaft or even preload the bearing.

What is claimed is:

1. A linear motion ball bearing for axial movement along a shaft and which has a plurality of raceways formed in a ball retainer, each of said raceways having a load-bearing portion and a load-free portion and substantially filled with balls and load-carrying plates attached to the load-bearing portions of each of said raceways characterized in that each of the load-bearing plates has an intermediate thicker portion whereby they may rock as the shaft is angularly displaced from coaxial alinement with the retainer.

2. A ball bearing as claimed in claim 1 in which each of said load-bearing plates has an external intermediate curved portion from which the outer surface extends to form a tapered portion of lesser thickness.

3. A ball bearing as claimed in claim 1 in which each of said load-bearing plates is held in said retainer and is angularly movable by deflection of the resilient material of said retainer.

4. A ball bearing as claimed in claim 1 which is mounted within a hard metal sleeve against which the load-carrying members may rock.

5. A ball bearing as claimed in claim 1 in which the load plates have a longitudinally extending depression on its outer face whereby the plate may yield compliantly under load.

6. A ball bearing as claimed in claim 1 in which the ball retainer is enclosed within an outer shell and the outer shell is apertured to receive and resiliently hold the load-carrying plates.

7. A ball bearing as claimed in claim 1 in which the raceways are oblong and formed in an inner sleeve formed from a moldable material and there is a surrounding sleeve of moldable material provided with apertures at the load-bearing portions of the raceway, the load-carrying plates being held in their respective apertures.

8. A ball bearing as claimed in claim 1 in which the ball retainer is formed of a resilient plastic material having a lubricant dispersed therein.

9. A ball bearing as claimed in claim 1 in which the bearing is mounted in a split housing and means are provided for adjusting the clearance of the bearing on its shaft by varying the compression of the housing on the bearing.

10. A self-alining, linear motion ball bearing having a plurality of hard, axially extending track members circumferentially spaced about an opening to receive a shaft, a cylindrical sleeve or moldable material in which said track members are embedded, said sleeve being formed with a plurality of oblong raceways each substantially filled with balls, each raceway including one of said track members and a connected passage for the return of the balls under no load, said track members each having a portion intermediate its ends extending further from the shaft than its ends, said raceway providing for engagement of the balls with the shaft and a hard track member as the balls recirculate in their raceways, and said track members each being angularly movable about its intermediate portion as the shaft is angularly displaced with respect to said sleeve the thinner end portions of each track member providing a resilient distribution of the load on the balls.

11. A linear motion ball bearing for axial movement along a shaft and which has a plurality of raceways formed in a ball retainer, each of said raceways having a load-bearing portion and a load-free portion and substantially filled with balls, said ball retainer being formed from a moldable material, and a load-carrying plate attached to the load-bearing portions of each of said raceways characterized in that each of the load-bearing plates has a longitudinally extending depression on its outer face providing circumferential ball compliance, and is thicker at its center so they may bend axially in compliance with loading variations providing uniform load distribution.

12. A linear motion ball bearing for axial movement along a shaft including an inner sleeve and a surrounding outer sleeve both formed of a moldable material and having a plurality of oblong raceways formed in the inner sleeve, each of said raceways having a load-bearing portion and a load-free portion and substantially filled with balls and load-carrying plates mounted in apertures in said outer sleeve at the load-bearing portions of each of said raceways characterized in that each of the load-bearing plates has an intermediate thicker portion whereby they may rock as the shaft is angularly displaced from coaxial alinement with the retainer.

References Cited
UNITED STATES PATENTS 2,640,365   6/1953   Michie              308—6C FRED C. MATTERN, JR., Primary Examiner F. SUSKO, Assistant Examiner

UNITED STATES PATENT OFFICE
CERTIFICATE OF CORRECTION

Patent No. 3,545,826    Dated December 8, 1970

Inventor(s) Robert C. Magee and John B. Thomson

It is certified that error appears in the above-identified patent and that said Letters Patent are hereby corrected as shown below:

Column 1, line 12, change "complaint" to - - compliant -

Column 2, lines 10 - 12, please rewrite as follows:

- -plate is provided with beveled longitudinal edges ha[v]

notches therein which engage with corresponding undercu[t]

tab projections in the retainer member. - -

Column 2, line 37, before the word "substantially" inse[rt]

- - remain - -

SIGNED AND
SEALED
MAR 9 1971

(SEAL)
Attest:

Edward M. Fletcher, Jr.
Attesting Officer

WILLIAM E. SCHUYLER,
Commissioner of Paten[ts]